US008801035B2

(12) United States Patent
Kim et al.

(10) Patent No.: US 8,801,035 B2
(45) Date of Patent: Aug. 12, 2014

(54) MOUNTING APPARATUS FOR AN EXTERNAL AIRBAG OF A VEHICLE

(71) Applicants: Hyundai Motor Company, Seoul (KR); Kia Motors Corp., Seoul (KR)

(72) Inventors: Yong Sun Kim, Namyangju-si (KR); Un Koo Lee, Seoul (KR); Seoung Hoon Lee, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 13/673,746

(22) Filed: Nov. 9, 2012

(65) Prior Publication Data

US 2013/0147174 A1 Jun. 13, 2013

(30) Foreign Application Priority Data

Dec. 9, 2011 (KR) ........................ 10-2011-0131838

(51) Int. Cl.
*B60J 11/00* (2006.01)
*B60R 19/20* (2006.01)

(52) U.S. Cl.
CPC .................................... *B60R 19/205* (2013.01)
USPC ...................... 280/770; 280/728.2; 280/728.3

(58) Field of Classification Search
USPC .................................... 280/728.2, 728.3, 770
See application file for complete search history.

(56) References Cited

U.S. PATENT DOCUMENTS

| | | | | |
|---|---|---|---|---|
| 5,646,613 | A * | 7/1997 | Cho | 340/903 |
| 5,959,552 | A * | 9/1999 | Cho | 340/903 |
| 6,106,038 | A * | 8/2000 | Dreher | 293/118 |
| 6,474,679 | B2 * | 11/2002 | Miyasaka et al. | 280/730.1 |
| 6,497,302 | B2 * | 12/2002 | Ryan | 180/274 |
| 6,827,170 | B2 * | 12/2004 | Hamada et al. | 180/274 |
| 6,857,495 | B2 * | 2/2005 | Sawa | 180/274 |
| 6,923,483 | B2 * | 8/2005 | Curry et al. | 293/107 |
| 7,000,725 | B2 * | 2/2006 | Sato et al. | 180/274 |
| 7,073,619 | B2 * | 7/2006 | Alexander et al. | 180/274 |
| 7,753,159 | B2 * | 7/2010 | Kim et al. | 180/274 |
| 8,042,449 | B2 * | 10/2011 | Farinella et al. | 89/36.01 |
| 8,141,470 | B1 * | 3/2012 | Farinella et al. | 89/36.01 |
| 2005/0269805 | A1 * | 12/2005 | Kalliske et al. | 280/730.1 |
| 2008/0309060 | A1 * | 12/2008 | Hakki et al. | 280/770 |
| 2010/0140903 | A1 * | 6/2010 | Choi et al. | 280/728.2 |

FOREIGN PATENT DOCUMENTS

WO WO 03/053748 A1 7/2003

* cited by examiner

*Primary Examiner* — Toan To
(74) *Attorney, Agent, or Firm* — Morgan, Lewis & Bockius LLP

(57) ABSTRACT

A mounting apparatus for an external airbag cushion of a vehicle may include a seal side unit provided with a seal side panel that may be arranged on a lower side of a vehicle body and a seal side molding covering a part of the seal side panel that may be exposed to the outside of the vehicle body, and an external airbag module that may be provided inside the seal side unit and allows the external airbag cushion to be deployed outside the seal side molding when the external airbag cushion may be deployed.

18 Claims, 5 Drawing Sheets

MOUNTING APPARATUS FOR AN EXTERNAL AIRBAG OF A VEHICLE

CROSS-REFERENCE TO RELATED APPLICATION

The present application claims priority to Korean Patent Application No. 10-2011-0131838, filed on Dec. 9, 2011, the entire contents of which is incorporated herein for all purposes by this reference.

BACKGROUND OF THE INVENTION

1. Field of the Invention

The present disclosure relates to a mounting apparatus for an external airbag of a vehicle, capable of reducing impact while a vehicle collides by mounting a large external airbag to a side of a vehicle, and applying an external airbag to a practical vehicle.

2. Description of Related Art

Generally, an airbag serves to protect a passenger from an impact produced while a vehicle collides wherein when the impact is sensed by a sensor, gas is supplied rapidly through an inflator to deploy instantly an airbag cushion thereby protecting the passenger on a seat of a vehicle.

The airbag has been arranged generally on an inner part of a vehicle to be deployed on a front side or a lateral side of a passenger. However, recently, an external airbag that is to be deployed outside a vehicle has been studied to decrease further the impact produced while a vehicle collides.

FIG. 1 is a view illustrating an external airbag that is installed on a vehicle according to a related art wherein an external airbag module 2 is housed at a middle of a door panel 1 of a vehicle, and the external airbag module 2 can be deployed by sensing the collision right before a vehicle collides.

An external airbag cushion of the external airbag module 2 is a part to contact directly a colliding vehicle wherein it has to have excellent high pressure and large size, comparing to an usual airbag used in an indoor part of a vehicle, in order for the external airbag to buffer sufficiently the impact produced from a collision of a weighted vehicle.

That is, when a gas pressure supplied while an existing indoor airbag is deployed is 200 kpa or so, a deployed volume of an airbag cushion is to accommodate 60 liters, the external airbag has to have the gas pressure of up to 4000 kpa and the volume of the airbag cushion is to accommodate about 600 liters.

However, a mounting apparatus for the external airbag is not fully prepared and further it is difficult for the external airbag module to be housed at a narrow internal space of a door panel while the external airbag is applied to a practical vehicle.

Further, a weak portion that is opened/closed or torn easily has to be provided separately on an external part of the door panel in order to deploy the external airbag cushion, and for this purpose the door panel has to be changed in its structure thereby affecting adversely a durability and design of a vehicle body.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a mounting apparatus for an external airbag of a vehicle in which a large external airbag is deployed at a lateral side of the vehicle to reduce injury to a passenger.

Another object of the present invention is to provide a mounting apparatus for an external airbag of a vehicle in which a space for mounting a large external airbag is provided at a lateral side of a vehicle and an external airbag can be mounted and applied to mass-produced practically vehicles.

In an aspect of the present invention, a mounting apparatus for an external airbag cushion of a vehicle, may include a seal side unit provided with a seal side panel that is arranged on a lower side of a vehicle body and a seal side molding covering a part of the seal side panel that is exposed to the outside of the vehicle body, and an external airbag module that is provided inside the seal side unit and allows the external airbag cushion to be deployed outside the seal side molding when the external airbag cushion is deployed.

The seal side panel is connected to a floor panel of the vehicle body.

The external airbag module is arranged in space provided between the seal side panel and the seal side molding.

The seal side panel may include a seal side outer panel, wherein a mounting groove portion is formed concavely at a part of a surface among outer form surfaces of the seal side outer panel facing to the seal side molding, and wherein the external airbag is mounted inside the mounting groove portion.

Support guide pieces are formed on inner upper and lower parts of the seal side molding to protrude, respectively and the support guide pieces are disposed on upper and lower ends of the external airbag, respectively.

The external airbag cushion is deployed through a portion formed on an inner surface of the seal side molding, the portion being weaker than other portion of the inner surface of the seal side molding.

The portion of the external airbag cushion is a tear line.

First fixing holes are formed on the seal side panel and wedges are provided on the seal side molding to be fastened correspondingly to the first fixing holes.

The external airbag module may include the external airbag cushion to be deployed toward the seal side molding, an inflator connected to the seal side panel and fluid-connected to the external airbag cushion and configured to inject gas into the external airbag cushion, and a retainer which is fixed to the mounting groove portion formed on the seal side panel and opened toward the seal side molding, and on which a fixing ring into which the inflator is fitted is formed.

The mounting groove portion is formed on the seal side outer panel and a vertical enforcement panel is arranged on an upward inner space of one seal side outer panel based on the mounting groove portion.

The vertical enforcement panel connects the seal side outer panel and the mounting groove portion.

The mounting groove portion is formed on the seal side outer panel and a vertical enforcement panel is arranged on and downward inner space of one seal side outer panel based on the mounting groove portion.

The vertical enforcement panel connects the seal side outer panel and the mounting groove portion.

The mounting groove portion is formed on the seal side outer panel and a horizontal enforcement panel is arranged on an inner space between an inner side surface of the mounting groove portion and an inner side surface of a seal side inner panel.

The horizontal enforcement panel connects the seal side inner panel, the seal side outer panel, and the mounting groove portion.

The external airbag module may include an inflator, an external airbag cushion, a retainer surrounding the inflator, and plural brackets which are connected in a longitudinal direction to a rear surface of the retainer and fixed to seal side panels disposed on lower and upper parts thereof.

A lower part of the bracket is an opened-clip shape to surround a lower end of the seal side outer panel.

A guide panel covering the external airbag module is provided between the external airbag module and the seal side molding, wherein second fixing holes are formed in the seal side panel, and wherein projections are formed on a lower end and an upper end of the guide panel to be fastened correspondingly to the second fixing holes, respectively.

It is understood that the term “vehicle” or “vehicular” or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
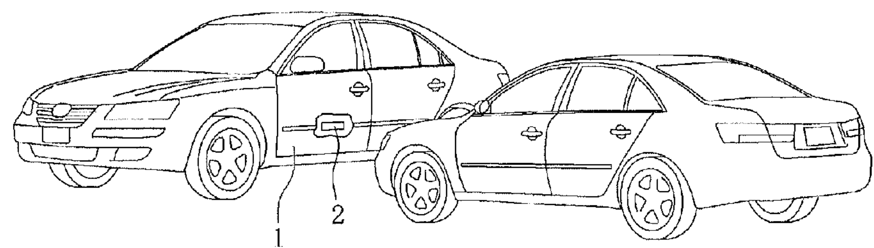
FIG. 1 is a perspective view illustrating a mounting state of an external airbag according to a related art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter reference will now be made in detail to various embodiments of the present invention, examples of which are illustrated in the accompanying drawings and described below.

Referring to FIGS. 2 to 10, the mounting apparatus for an external airbag according to an exemplary embodiment of the present invention includes: a seal side unit 100 provided with a seal side panel 110 that is arranged on a lower side of a vehicle body and a seal side molding 120 for covering a part of the seal side panel 110 that is exposed, and an external airbag module 200 that is provided inside the seal side unit 100 and allows an external airbag cushion 210 to be deployed outside the seal side molding 120 when the external airbag is deployed.

That is, the external airbag module 200 of a large size and configuration is provided on an extra space formed inside the seal side unit 100 and thus it is possible for the external airbag module 200 to be installed and applied on the mass-produced practically vehicles thereby increasing multiply the impact reduction effect.

Figure 3:
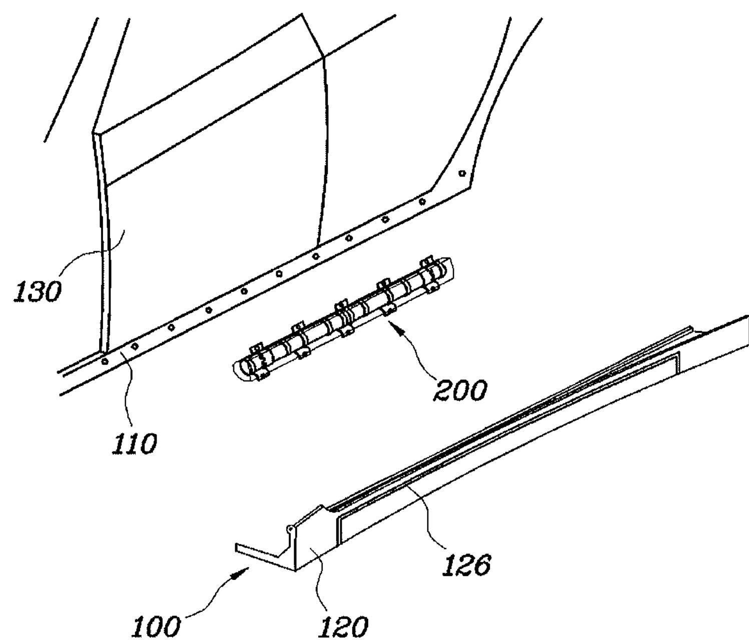
FIG. 3 is a view illustrating a mounting apparatus for an external airbag in a separating state according to an exemplary embodiment of the present invention.
Figure 4:
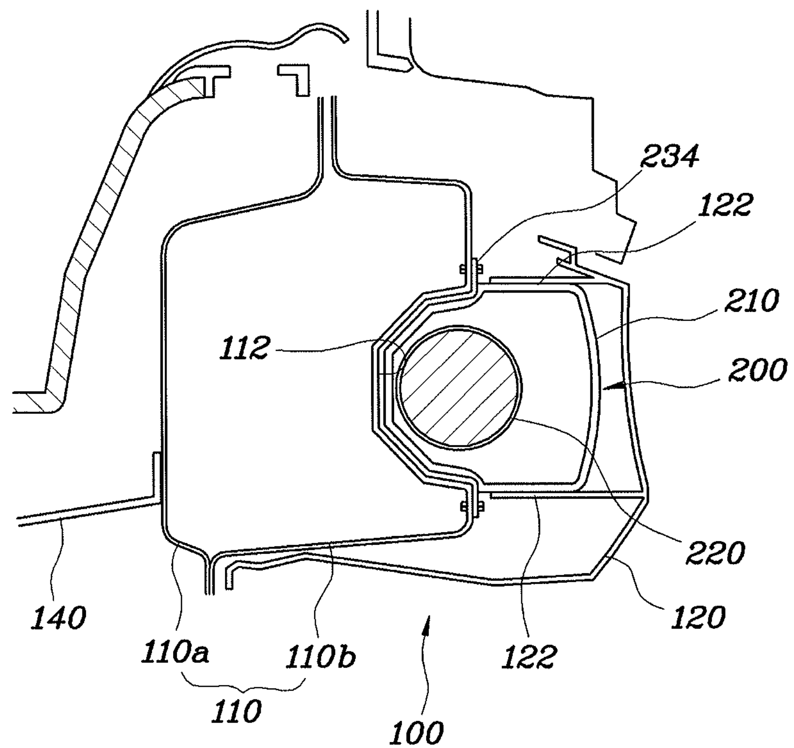
FIG. 4 is a cross-sectional view illustrating a mounting apparatus for an external airbag according to an exemplary embodiment of the present invention.

As shown in FIGS. 3 and 4, the external airbag module 200 according to an exemplary embodiment of the present invention may be arranged on space provided between the seal side panel 110 and the seal side molding 120.

Preferably, a mounting groove 112 may be provided on a part of outer form surface of the seal side panel 110 facing to the seal side molding 120 wherein the external airbag 200 may be mounted inside the mounting groove 112.

Here, the seal side panel 110 is installed on a lower part of a door panel 130 wherein it is classified as a seal side inner panel **110*a* and a seal side outer panel 110*b*. The seal side inner panel 110*a* is fixed to a floor panel 140 and further the seal side outer panel 110*b* is fixed to the outside of the seal side inner panel 110*a* to form a mounting groove portion 112 at a part of a surface among the outer form surfaces of the seal side outer panel 110*b* facing to the seal side molding 120**.

At this time, the mounting groove portion 112 protrudes toward the seal side inner panel **110*a* and its inner side surface is recessed wherein the inner space of the mounting groove portion 112 is sized to accommodate at least a part of the external airbag module 200**.

As described above, the space of the mounting groove portion 112 is formed lengthy along a longitudinal direction of the seal side outer panel **110*b* and thus a sufficient space for mounting the external airbag 200** of a large size can be prepared.

As shown in FIG. 4, support guide pieces 122 are formed on the inner upper and lower parts of the seal side molding 120 to protrude, respectively wherein the support guide pieces 122 are disposed on the upper and lower ends of the external airbag 200, respectively.

That is, an external airbag cushion 210 breaks through the seal side molding 120 when it is deployed initially, and at this time the support guide pieces 122 are supported on the upper and lower ends of the external airbag cushion 210, respectively and thus the external airbag cushion 210 is guided to be deployed toward a front of the seal side molding 120.

Further, the support guide piece 122 that is provided normally on the lower part to support the external airbag 200 thereon and thus the external airbag can be deployed smoothly to a setting direction.

As shown in FIG. 3, a weak portion 126 is formed on an inner surface of the seal side molding 120, through which the external airbag cushion 210 is deployed. The weak portion 126 may be a tear-line. As an example, the tear line portion is to be torn when the external airbag cushion 210 is deployed, and the external airbag cushion 210 is to be deployed through the torn tear line.

Figure 5:
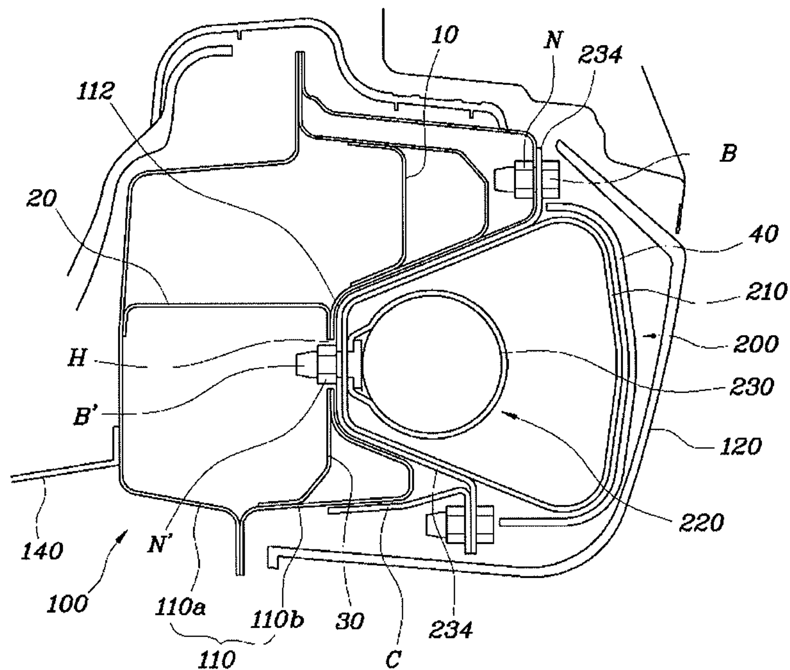
FIGS. 5 and 6 are cross-sectional views illustrating a mounting apparatus for an external airbag according to another exemplary embodiment of the present invention.
Figure 6:
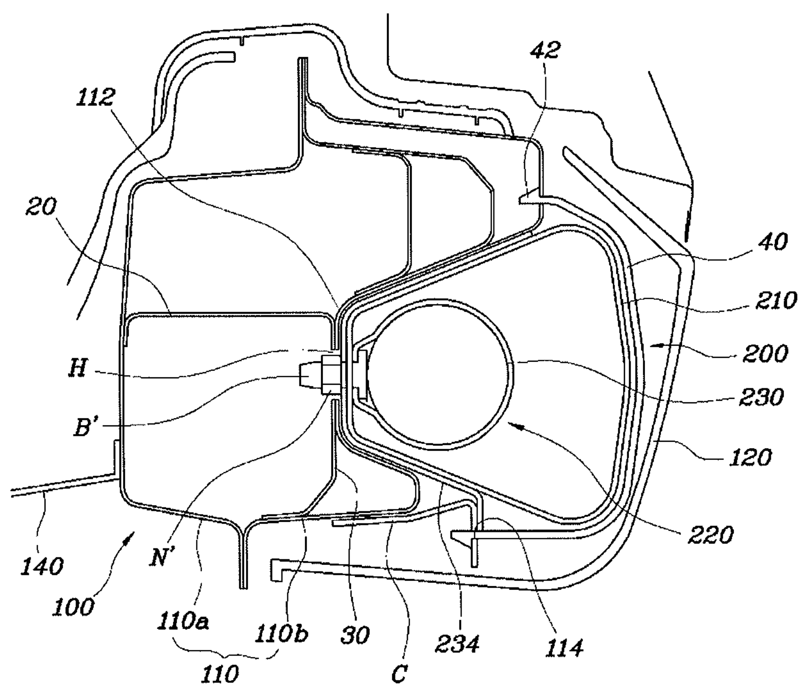

FIGS. 5 and 6 are cross-sectional views illustrating a mounting apparatus for an external airbag according to another exemplary embodiment of the present invention.

In case of the exemplary embodiment as shown in drawings, the mounting groove portion 112 is formed on the seal side outer panel 110*b* and further a vertical enforcement panel 10 is arranged on an upward inner space of one seal side outer panel 110*b* based on the mounting groove portion 112. Further, another vertical enforcement panel 30 is arranged on a downward inner space of another seal side outer panel 110*b* and a horizontal enforcement panel 20 is arranged on an inner space between the inner side surface of the mounting groove portion 112 and the inner side surface of the seal side inner panel 110*a*. When the mounting groove portion 112 is indented to the inner side of the seal side outer panel 110*b*, a closed-sectional area decreases and a buckling may be occurred, and thus the enforcement panels are provided on the upper, lower and middle parts for enforcement to maintain constant rigidity even though the external airbag is mounted.

Further, the external airbag module 200 includes an inflator 220, an external airbag cushion 210, a retainer 230 surrounding the inflator 220 and plural brackets 234 which are connected in a longitudinal direction to a rear surface of the retainer 230 through a bolt B' and a nut N' and fixed to the seal side panels 110*b* disposed on a lower and upper parts thereof. Further, a though hole H is formed on the mounting groove portion 112 for mounting the bolt B'.

Further, the lower part C of the bracket 234 is an opened-clip shape to surround the lower end of the seal side outer panel 110*b* thereby ensuring efficiently a fastening structure.

Meanwhile, a guide panel 40 covering the external airbag module 200 is provided between the external airbag module 200 and the seal side molding 120, a fixing hole 114 is formed in the seal side panel 110, and projections 42 are formed on a lower and upper ends of the guide panel 40 to be fastened correspondingly to the fixing holes, respectively. Through this configuration, the space between the seal side molding 120 and the external airbag module 200 can be designed to be minimized to increase a space use degree of the seal side portion.

Further, FIG. 5 is a cross-sectional view illustrating a connection portion between the bracket 234 and the seal side outer panel 110*b* through the bolt B and the nut N, and FIG. 6 is a cross-sectional view illustrating a connection point between the bracket 234 and the seal side outer panel 110*b* through the projection 42 that is formed on the guide panel 40 and is connected to the seal side outer panel 110*b*, instead of the bolt B.

Figure 7:
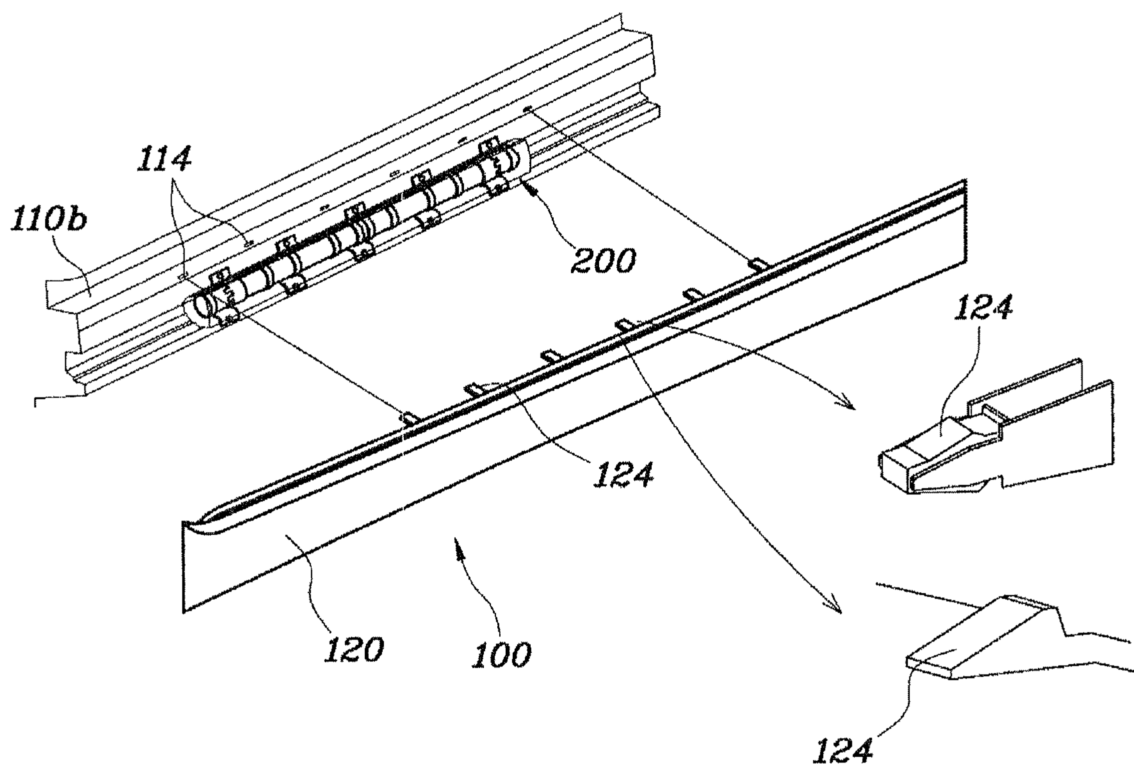
FIG. 7 is a perspective view illustrating an assembled state of a seal side panel and a seal side molding according to an exemplary embodiment of the present invention.

As shown in FIG. 7, the fixing holes 114 are formed on the seal side panel 110 and wedges 124 may be provided on the seal side molding 120 to be fastened correspondingly to the fixing holes 114.

That is, since the external airbag cushion 210 tears the weak portion 126 of the seal side molding 120 to be deployed, the seal side molding 120 has to be kept in a state of being fastened to the seal side outer panel 110*b*. Accordingly, the wedge 124 provided on the seal side molding 120 is fitted into the fixing hole 114 provided in the seal side outer panel 110*b* to keep firmly a connection force of the seal side molding 120.

At this time, the fixing hole 114 and the wedge 124 may be formed as plural to keep firm connection force and further the wedge may be shaped as a fixing clip or a hook.

Figure 8:
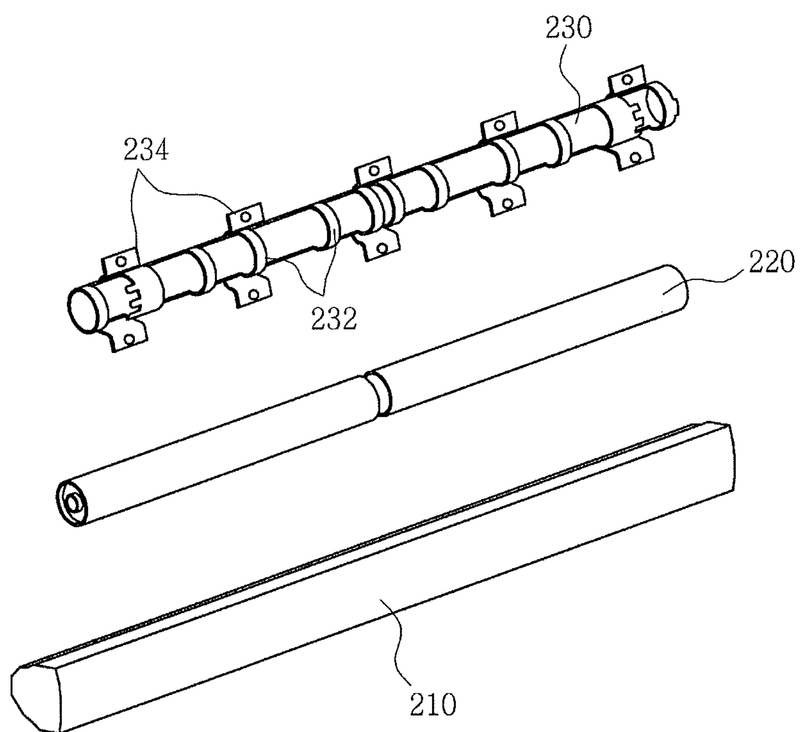
FIG. 8 is a perspective view illustrating a disassembled state of an external airbag module according to an exemplary embodiment of the present invention.

Meanwhile, as shown in FIG. 8, the external airbag module 200 may include an external airbag cushion 210 to be deployed toward the seal side molding 120, an inflator 220 connected to the external airbag cushion 210 and injecting gas into the external airbag cushion 210, and a retainer 230 which is fixed to the mounting groove portion 112 formed on the seal side panel 110 and opened toward the seal side molding 120, and on which a fixing ring 232 into which the inflator 220 is fitted is formed.

At this time, the inflator 220 is formed lengthy along the mounting groove portion 112 wherein plural fixing rings are provided for the inflator 220 to be mounted on the retainer 230.

Further, plural brackets 234 are fixed to a rear surface of the retainer 230, and the bracket 234 may be fixed to the seal side outer panel 110*b* disposed on the upper and lower parts of the mounting groove portion 112 through a bolting.

That is, the external airbag cushion 210 and the inflator 220 are connected to the retainer 230 to be mounted as an external airbag module 200 and the external airbag module 200 is fixed to the seal side panel 110 through a bolting to simplify a configuration of the external airbag module 200 and further mount the external airbag module simply to inner part of a vehicle.

Meanwhile, it is described that the external airbag module 200 is mounted to a side part of a vehicle, however, the external airbag module 200 may be mounted to a front or a rear part of a vehicle.

An operation and effects of the present invention will be described in detail.

When a signal for deployment is to be sent to the external airbag module 200 right before a vehicle collides from a side, gas is supplied into the external airbag cushion 210 from the inflator 220 to swell rapidly it.

Figure 2:
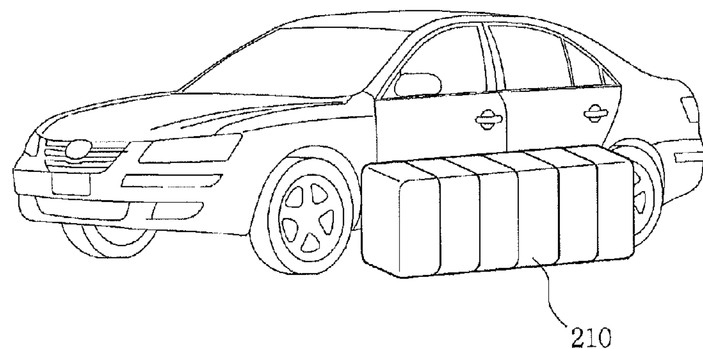
FIG. 2 is a perspective view illustrating an external airbag cushion in a deploying state on a vehicle provided with a mounting apparatus for an external airbag according to an exemplary embodiment of the present invention.

At this time, the external airbag module 200 is mounted between the seal side panel 110 and the seal side molding 120 and thus the swollen external airbag cushion 210 tears the weak portion 126 formed on the seal side panel 110 to be deployed in a large size on a side part of a vehicle, as shown in FIG. 2.

As described above, the external airbag cushion 210 of a large size is deployed on a side part of a vehicle right before the vehicle collides and thus the external airbag cushion 210 absorbs collision energy produced while a vehicle collides to decrease prominently the impact thereby minimizing injury to a passenger.

Specially, the external airbag module 200 is arranged on an extra space formed inside the seal side unit 100 and thus the external airbag module 200 can be mounted and applied to a practical vehicle to increase safety and marketability of a vehicle.

Figure 9:
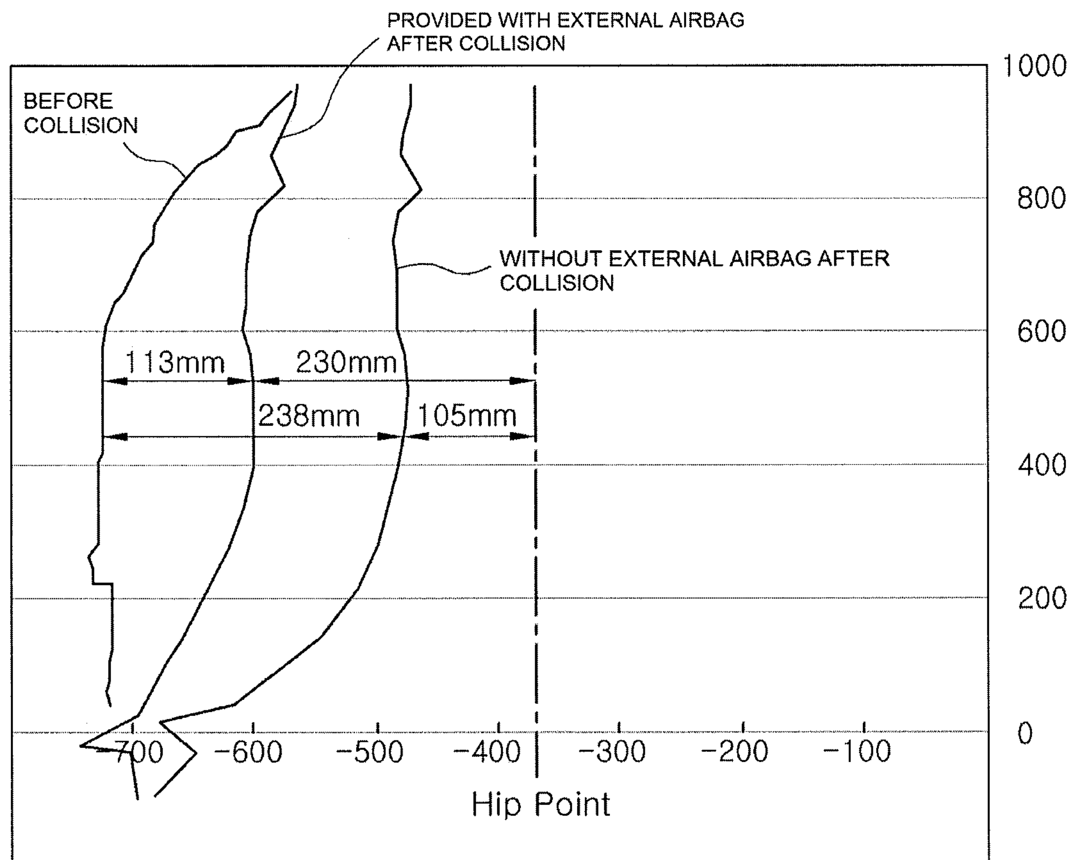
FIG. 9 is a graph illustrating body deformed-amount between a vehicle mounted with an external airbag and a vehicle without an external airbag according to an exemplary embodiment of the present invention after a collision.
Figure 10:
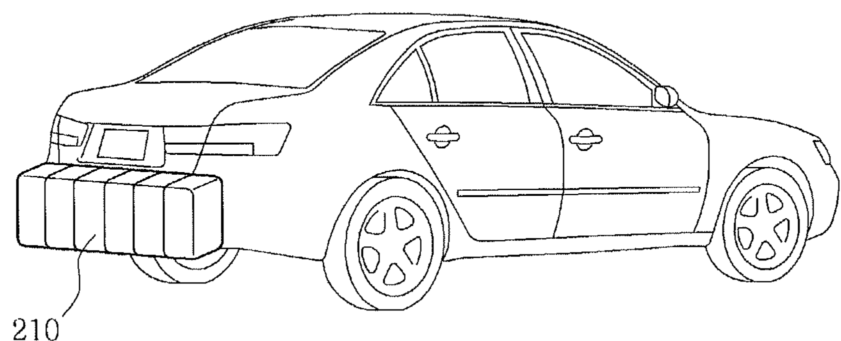
FIG. 10 is a perspective view illustrating an external airbag provided to a rear part of a vehicle while it is deployed.

Meanwhile, FIG. 9 is a graph illustrating body deformed-amount between a vehicle mounted with an external airbag and a vehicle without an external airbag according to an exemplary embodiment of the present invention after a collision.

That is, the external airbag cushion 210 absorbs considerably collision energy to decrease a body deformation length from 238 mm to 113 mm wherein the body deformation amount decreases to 53%, and a passenger survival space increases from 105 mm to 230 mm to increase 119%, comparing to the vehicle without the external airbag, thereby reducing greatly risk of injury to a passenger.

According to an exemplary embodiment of the present invention, the external airbag cushion of a large size is deployed on a side part of a vehicle right before the vehicle collides and thus the external airbag cushion absorbs collision energy produced while a vehicle collides to decrease prominently the impact thereby minimizing injury to a passenger.

Furthermore, according to an exemplary embodiment of the present invention, the external airbag module is arranged on an extra space formed inside the seal side unit and thus the external airbag module can be mounted and applied to a practical vehicle to increase safety and marketability of a vehicle.

For convenience in explanation and accurate definition in the appended claims, the terms “upper”, “lower”, “inner” and “outer” are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A mounting apparatus for an external airbag cushion of a vehicle, comprising:

a seal side unit provided with a seal side panel that is arranged on a lower lateral side of a vehicle body below a door panel and a seal side molding extending in a longitudinal direction of the vehicle body and covering a part of the seal side panel that is exposed to the outside of the vehicle body; and an external airbag module that is provided inside the seal side unit and allows the external airbag cushion to be deployed outside the seal side molding when the external airbag cushion is deployed.

2. The mounting apparatus for the external airbag cushion of the vehicle of claim 1, wherein the seal side panel is directly connected to a floor panel of the vehicle body in the longitudinal direction of the vehicle body.

3. The mounting apparatus for the external airbag cushion of the vehicle of claim 1, wherein the external airbag module is arranged in space provided between the seal side panel and the seal side molding.

4. The mounting apparatus for the external airbag cushion of the vehicle of claim 1, wherein the seal side panel includes a seal side outer panel, wherein a mounting groove portion is formed concavely at a part of a surface among outer form surfaces of the seal side outer panel facing to the seal side molding, and wherein the external airbag is mounted inside the mounting groove portion.

5. The mounting apparatus for the external airbag cushion of the vehicle of claim 4, wherein support guide pieces are formed on inner upper and lower parts of the seal side molding to protrude, respectively and the support guide pieces are disposed on upper and lower ends of the external airbag, respectively.

6. The mounting apparatus for the external airbag cushion of the vehicle of claim 4, wherein the external airbag cushion is deployed through a portion formed on an inner surface of the seal side molding, the portion being weaker than other portion of the inner surface of the seal side molding.

7. The mounting apparatus for the external airbag cushion of the vehicle of claim 6, wherein the portion of the external airbag cushion is a tear line.

8. The mounting apparatus for the external airbag cushion of the vehicle of claim 4, wherein first fixing holes are formed on the seal side panel and wedges are provided on the seal side molding to be fastened correspondingly to the first fixing holes.

9. The mounting apparatus for the external airbag cushion of the vehicle of claim 4, wherein the external airbag module includes:

the external airbag cushion to be deployed toward the seal side molding;

an inflator connected to the seal side panel and fluid-connected to the external airbag cushion and configured to inject gas into the external airbag cushion; and a retainer which is fixed to the mounting groove portion formed on the seal side panel and opened toward the seal side molding, and on which a fixing ring into which the inflator is fitted is formed.

10. The mounting apparatus for the external airbag cushion of the vehicle of claim 4, wherein the mounting groove portion is formed on the seal side outer panel and a vertical enforcement panel is arranged on an upward inner space of one seal side outer panel based on the mounting groove portion.

11. The mounting apparatus for the external airbag cushion of the vehicle of claim 10, wherein the vertical enforcement panel connects the seal side outer panel and the mounting groove portion.

12. The mounting apparatus for the external airbag cushion of the vehicle of claim 4, wherein the mounting groove portion is formed on the seal side outer panel and a vertical enforcement panel is arranged on and downward inner space of one seal side outer panel based on the mounting groove portion.

13. The mounting apparatus for the external airbag cushion of the vehicle of claim 12, wherein the vertical enforcement panel connects the seal side outer panel and the mounting groove portion.

14. The mounting apparatus for the external airbag cushion of the vehicle of claim 4, wherein the mounting groove portion is formed on the seal side outer panel and a horizontal enforcement panel is arranged on an inner space between an inner side surface of the mounting groove portion and an inner side surface of a seal side inner panel.

15. The mounting apparatus for the external airbag cushion of the vehicle of claim 14, wherein the horizontal enforcement panel connects the seal side inner panel, the seal side outer panel, and the mounting groove portion.

16. The mounting apparatus for the external airbag cushion of the vehicle of claim 4, wherein the external airbag module includes:

an inflator;

an external airbag cushion;

a retainer surrounding the inflator; and plural brackets which are connected in a longitudinal direction to a rear surface of the retainer and fixed to seal side panels disposed on lower and upper parts thereof.

17. The mounting apparatus for the external airbag cushion of the vehicle of claim 16, wherein a lower part of the bracket is an opened-clip shape to surround a lower end of the seal side outer panel.

18. The mounting apparatus for the external airbag cushion of the vehicle of claim 4, wherein a guide panel covering the external airbag module is provided between the external airbag module and the seal side molding, wherein second fixing holes are formed in the seal side panel, and wherein projections are formed on a lower end and an upper end of the guide panel to be fastened correspondingly to the second fixing holes, respectively.

* * * * *